Sept. 11, 1928.
J. O. CARREY
1,683,954
MULTIPLE FLY WHEEL AND CENTRIFUGAL CLUTCHING MECHANISM THEREFOR
Filed Oct. 30, 1924　　　4 Sheets-Sheet 1
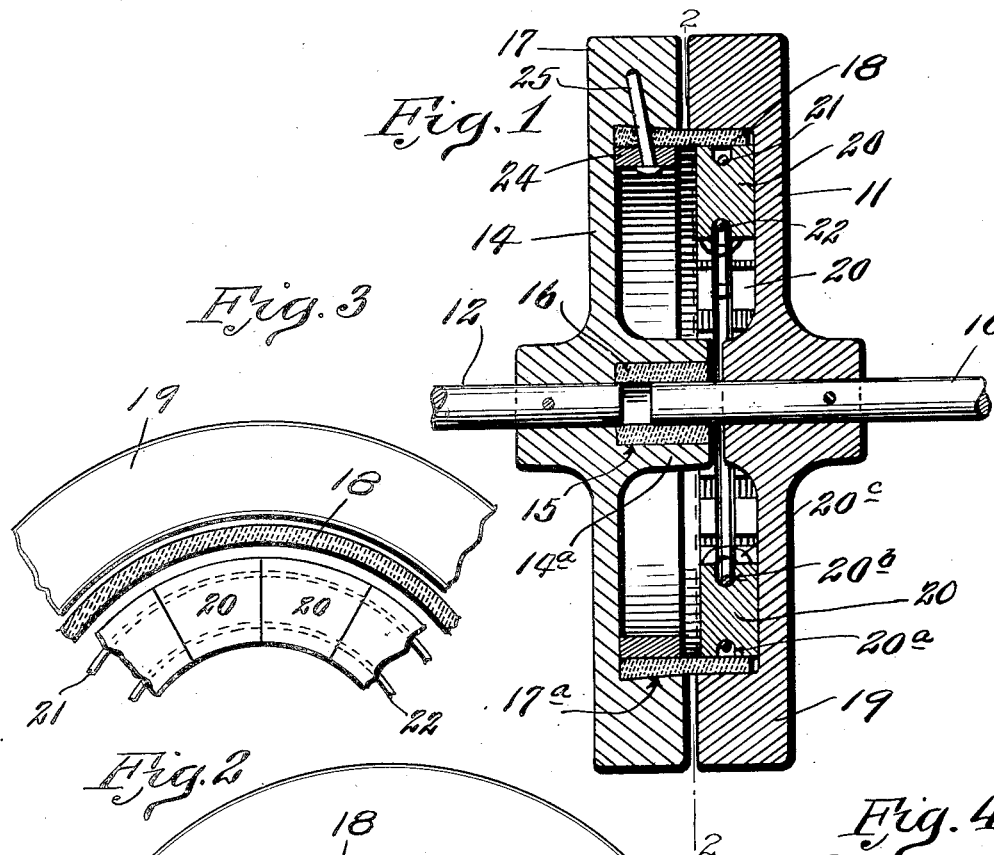
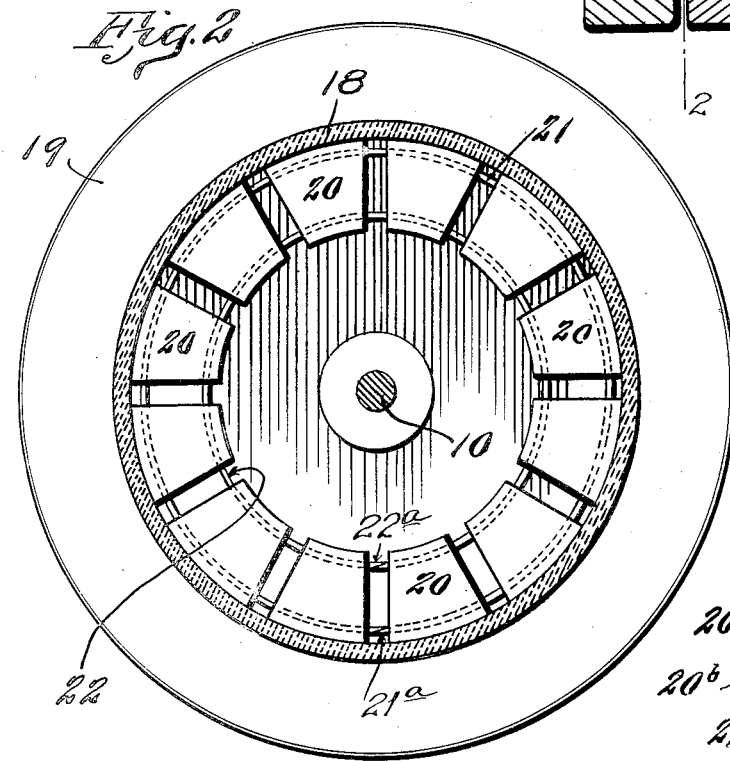
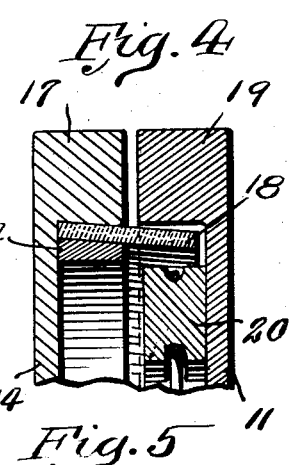
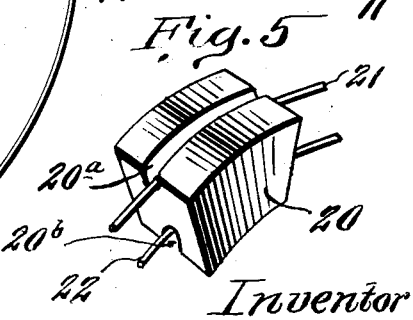
Inventor
John O. Carrey
By Cornwall, Birdell & Janus
Attys.

Sept. 11, 1928.  J. O. CARREY  1,683,954
MULTIPLE FLY WHEEL AND CENTRIFUGAL CLUTCHING MECHANISM THEREFOR
Filed Oct. 30, 1924    4 Sheets-Sheet 2

Inventor
John O. Carrey
By Cornwall, Bedell & Janney
Att'ys

Sept. 11, 1928.   1,683,954
J. O. CARREY
MULTIPLE FLY WHEEL AND CENTRIFUGAL CLUTCHING MECHANISM THEREFOR
Filed Oct. 30, 1924    4 Sheets-Sheet 3
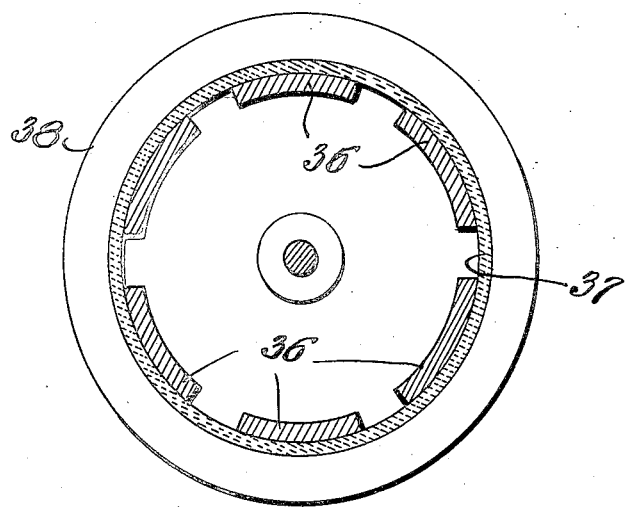
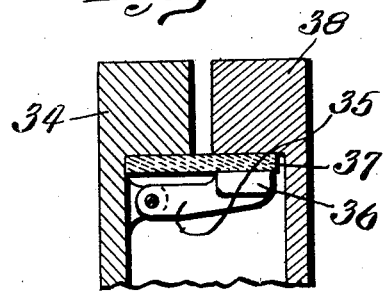
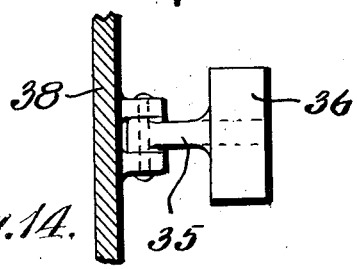
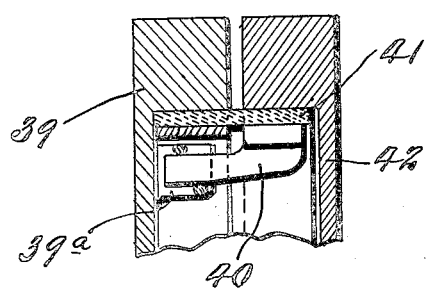
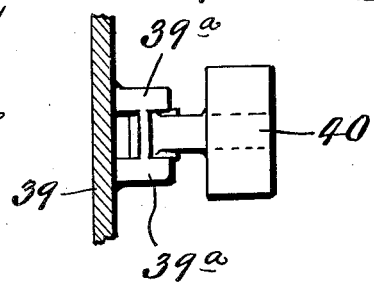
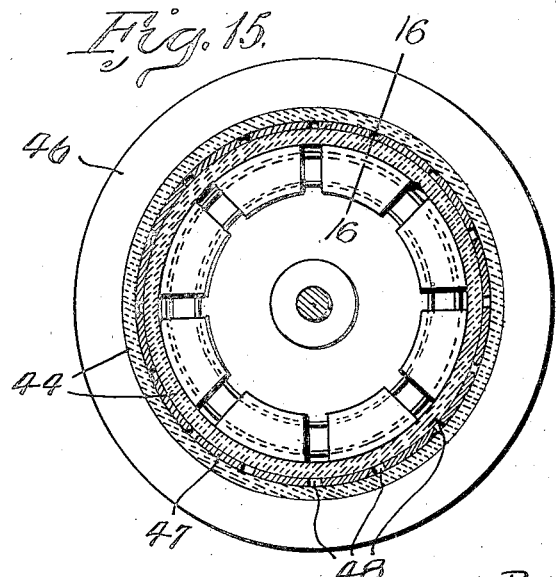
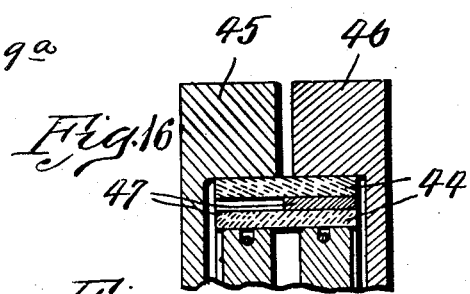
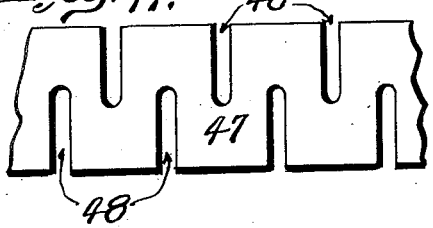
Inventor
John O. Carrey
By Cornwall, Bedell & Janis
Attys.

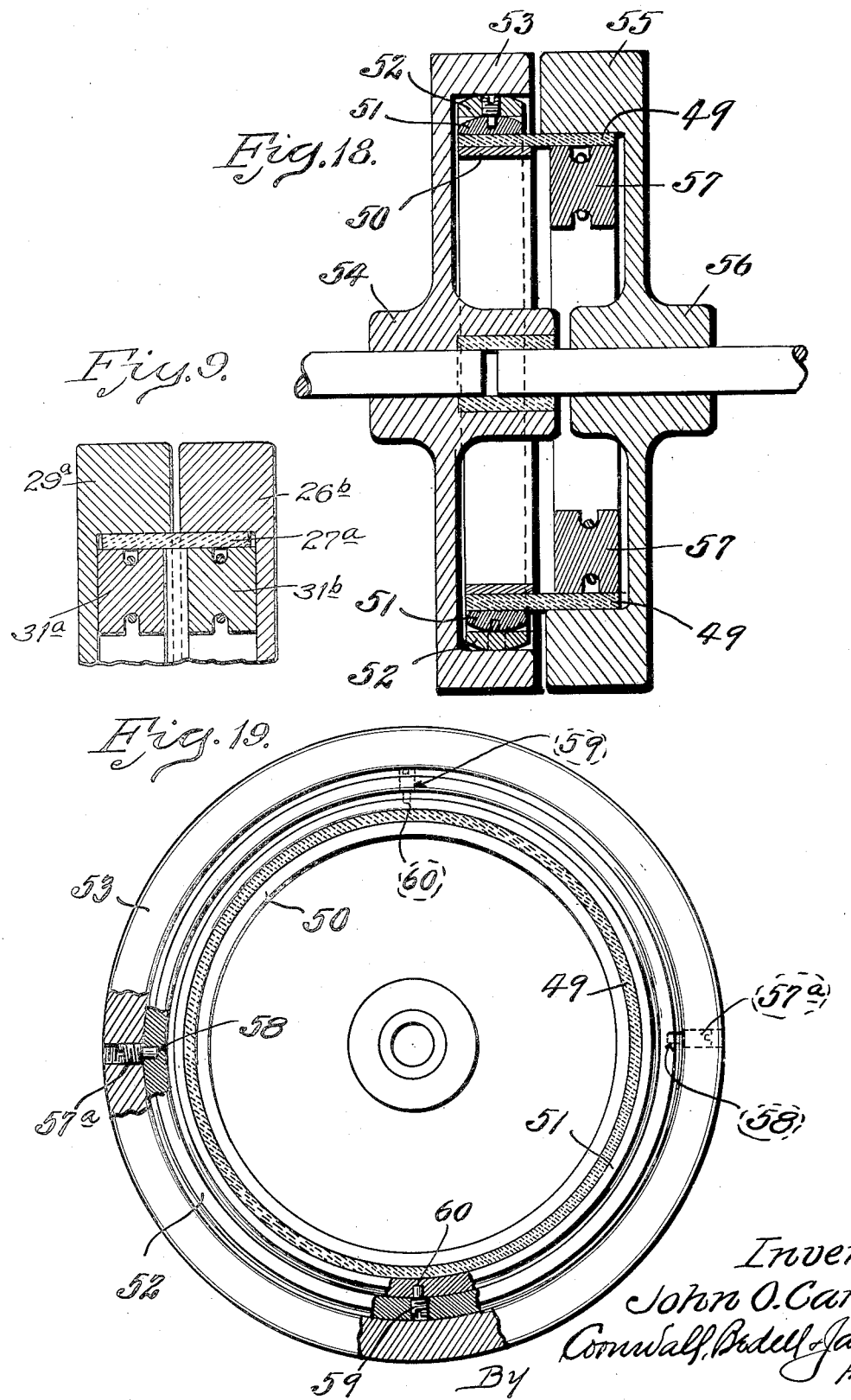

Patented Sept. 11, 1928.

1,683,954

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

MULTIPLE FLYWHEEL AND CENTRIFUGAL CLUTCHING MECHANISM THEREFOR.

Application filed October 30, 1924. Serial No. 746,776.

This invention relates to multiple fly wheels and centrifugal clutch mechanism for controlling the same whereby one fly wheel member is fixed to a driving means and the other fly wheel member is carried by a driven shaft and adapted to enter into or be released from cooperating engagement with the first fly wheel member at predetermined speeds.

The object of the invention is to provide means for starting intermittent loads, such as pumps, air compressors, punch presses, etc., wherein the load is started against high pressure.

Further objects of the invention are to provide simple and efficient means for controlling the cooperating engagement between said fly wheel members.

Still further objects of the invention are to provide a fly wheel comprising a plurality of members which are adapted to be set in operation progressively at predetermined speeds, thereby gradually increasing the weight and momentum of the fly wheel in correlation with the speed and thus eliminating heavy strain on the driving means during the starting operation.

Other objects of the invention are to provide simple and efficient clutching means operable by centrifugal force for controlling the driving connections between the fly wheel members.

With these and other objects in view, my invention consists in certain novel features of construction and arrangement of parts, hereinafter more fully described and claimed, and illustrated in the accompanying drawings, in which—

Figure 1 is a vertical longitudinal section taken through the fly wheel and showing the fly wheel members in cooperative or interengaged position.

Figure 2 is a transverse cross section taken on line 2—2 of Figure 1 and showing the clutching means in operative position.

Figure 3 is a fragmental view of the driving fly wheel member showing the clutching means in inoperative or disengaged position.

Figure 4 is a fragmental cross section through the fly wheel showing the clutching means in inoperative or disengaged position.

Figure 5 is a perspective detail view of one of the blocks constituting the centrifugally operable members of the clutch.

Figure 9 is a fragmental sectional view of a further modified form.

Figure 10 is an end elevational view of a driven fly wheel member and showing, in cross section, the friction band and sections of the pivotal arms carried by the driving fly wheel member.

Figure 11 is a fragmental section of the fly wheel members and showing the pivotal arm actuated by centrifugal force for bringing the friction band into engagement with the driven fly wheel member.

Figure 12 is a top plan view of one of the pivotal arms.

Figure 13 is a fragmental sectional view of another modified form of the multiple fly wheel.

Figure 14 is a top plan view of the weighted arm shown in Figure 13 and its connections with the driving fly wheel member.

Figure 15 is an end elevational view of a driving fly wheel member and showing in cross section the frictional means used for effecting interengagement between the driven and driving fly wheel members.

Figure 16 is a vertical section taken on line 16—16 of Figure 15.

Figure 17 is a top plan view of a portion of a reinforcing member utilized in connection with the friction means shown in Figures 15 and 16.

Figure 18 is a longitudinal cross section taken through the modified form of my multiple fly wheel and showing means for providing flexible driving connection between the driving and driven fly wheel members.

Figure 19 is an end elevational view of the driven fly wheel member partly broken away to more clearly illustrate my invention.

Figure 6:
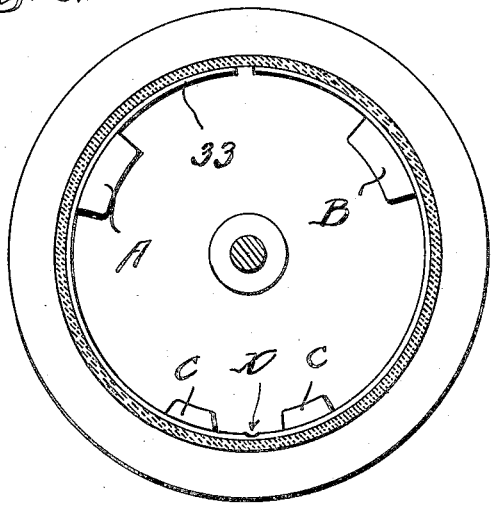
Figure 6 is an end elevational view of the driving member of another modified form of my invention.

In the present invention, the fly wheel comprises two members, a driving member and a driven member, which are approximately of the same diameter. The driving wheel member is secured to the driving means, such as a shaft, and the driven fly wheel member is secured to the driven shaft and said wheel members are adapted to be operatively interengaged by means of a centrifugally actuated clutch.

It will be understood that the driving fly wheel member after it is set in motion has the power plus the momentum that is stored up in said driving member. After said member has attained a predetermined speed, the centrifugal clutch is operated to interengage the driving and driven fly wheel members, thereby setting said driven fly wheel member in action. Thus the fly wheel as a whole is gradually brought in operation and relieves the motor of an excessive load during the starting operation.

Referring by numerals to the accompanying drawings, 10 indicates the driving shaft to which is fixed a driving fly wheel member 11. A driven shaft 12 is coaxially arranged with shaft 10 and has fixed thereto a driven fly wheel member 14. The inwardly disposed portion 14$^a$ of member 14 is provided with an enlarged bore 15 in which is disposed a tubular section 16 formed of suitable cushioning material, such as a friction band, and the end of shaft 10 projects beyond the hub of the driving member 11 into the seat formed by said cushioning material 16. Thus said hub portion 14$^a$ forms a bearing for the extreme end of the driving shaft and the friction member 16 serves as a seat for said shaft and cushions vibrations produced by said rapidly revolving shaft.

Driven fly wheel member 14 is provided with a rim 17 to the inwardly disposed face of which is secured a concentrically disposed section of flexible friction material 18, preferably formed of a section of material commonly used for brake bands for vehicles. The width of this frictional member 18 is greater than the width of the inner face of rim 17 and a portion of said member 18 projects outwardly from driven fly wheel member 14 and is disposed adjacent to the inner face of the rim 19 of the driving fly wheel member 11. A series of segmental weighted blocks 20 is concentrically disposed in the space formed by rim 19 of member 11 inwardly of friction member 18 and the outer face of each block 20 is curved to conform to the curvature of member 18 and is adapted when member 11 is actuated to move under centrifugal force outwardly against member 18 and force the latter into engagement with the rim 19 of member 11, thereby establishing driving connection between the driving member 11 and the driven member 14. Blocks 20 are loosely arranged within wheel 11 and to prevent their displacement therefrom said blocks are provided with an outer and an inner groove 20$^a$ and 20$^b$, respectively, for receiving spring rings 21 and 22. These rings are formed yielding and are split, as indicated in Figure 2 at 21$^a$ and 22$^a$ respectively, so as to permit the expansion of said rings when the blocks 20 are moved outwardly by centrifugal action. When the speed of the driving fly wheel member 11 falls below a predetermined degree, said split rings contract and cause blocks 20 to move inwardly out of engagement with the friction member 18. The ends of said split rings preferably have overlapping relation in order to permit the expansion and contraction of said split rings without the danger of disengagement thereof or the displacement of blocks 20. The inwardly disposed grooves 20$^b$ are preferably provided with rings or cross pieces 20$^c$ which are seated in the inner faces of blocks 20 and prevent the displacement of the inner ring 22.

In the operation of the device, assuming that the driving member 11 is at a stand still, segmental blocks 20 occupy the position shown in Figure 3, wherein the outer faces of said blocks are spaced inwardly from friction member 18, the lowermost block or blocks being in contact with the latter due to gravity and said friction member 18 being spaced from the inner face of rim 19. This displacement of blocks 20 is very slight and does not interfere with the proper functioning of the device as the pressure exerted against member 18 by said blocks is not sufficient to effect interengagement between the fly wheel members. When member 11 is actuated and after obtaining proper speed, blocks 20 move outwardly under centrifugal action, overcoming the resiliency of rings 21 and 22 and force friction member 18 into operating contact with the inner face of rim 19 of member 11. Member 18 being fixed to the rim of driven fly wheel 14, the latter will thereby be driven in unison with the driving fly wheel member 11.

Member 18 is preferably fixed in position on rim 17 by means of a ring 24 which is driven in position and clamps member 18 against the inner face of rim 17. Ring 24 and member 18 may be further secured in position by a pin or screw 25 driven into the rim 17. If desired, the inner face of rim 17 may be undercut as indicated at 17$^a$ in order to securely seat member 18 in the driven fly wheel member 14.

The form disclosed in Figures 1 to 5 is designed to be used for clutching in or establishing driving connection between two or more sections of the fly wheel when the driving member reaches a predetermined speed.

Figure 7:
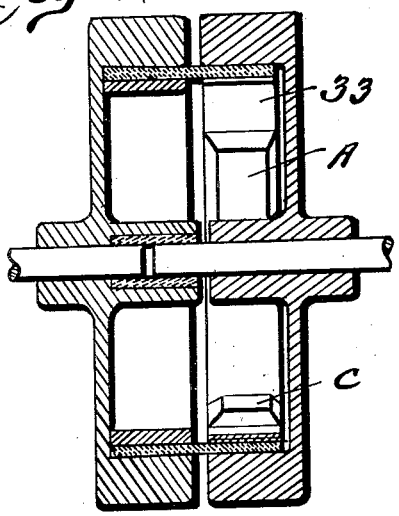
Figure 7 is a vertical section taken longitudinally through the same.
Figure 8:
Figure 8 is a fragmental detail view of the friction or clutching member.

The form shown in Figures 6 to 8 discloses a resilient split ring 33 carried by the driving member and normally occupying contracted position away from the friction member and adapted to expand and force the friction member into driving engagement with the driving member. This ring carries weights A and B near its ends and is transversely grooved at a point diametrically opposite to its ends as at X, to permit the outward movement of the two sections under the influence of centrifugally operated weights A and B. A pair of comparatively small weights C is arranged equidistant on each side of point X for counterbalancing the large weights A and B.

In the form shown in Figure 9 a friction member 27ª is loosely arranged against the inner faces of the rims of a driven member 29ª and driving member 26ᵇ and blocks 31ª and 31ᵇ are disposed in the respective members and are designed to grip the friction member against said rims and establish driving connection therebetween.

In Figures 10 to 12 is shown a modified form wherein a driving member 34 is provided with a series of weighted arms 35 pivotally connected to said driving member and having their weighted ends 36 adapted to bear against a friction member 37 and press the latter into driving engagement with a driven fly wheel member 38.

In the form shown in Figures 13 and 14, the driving member 39 is provided with inwardly disposed lugs 39ª in which are slidably mounted the ends of arms 40 which are adapted to bear against the friction member 41 carried by the driving member and force it into driving engagement with the driven member 42.

In the form shown in Figures 15 to 17, a pair of friction members 44 is provided for establishing driving connection between a driven fly wheel member 45 and the driving fly wheel member 46. Interposed between said friction members 44 is a reinforcing member 47, preferably formed of metal and this member is provided with spaced notches 48, as shown in Figure 17, which increases the yielding qualities of said reinforcing member.

In most of the forms previously described, the friction member is rigidly carried by one of the fly wheel members and in such form it is necessary that the axes of said members be in alignment in order to insure efficient operation of the device.

In Figures 18 and 19 a modified form of the device is shown, wherein the friction member 49 is fixed by means of a ring 50 to the flat face of an inner ring 51, the outer face of which is curved in transverse cross section and engages the inner flat face of an outer ring 52 which is similarly formed having its outer convex face bearing against the inner face of a rim 53 of a driven fly wheel member 54. Friction member 49 is adapted to be brought into driving engagement with the rim 55 of a driving member 56 by means of weights 57 carried by said driving member 56. Outer ring 52 is pivotally secured to the rim 53 by means of diametrically opposed pins or screws 57ª seated in said ring and having their inner ends engaging recesses or seats 58 formed in the outer face of ring 52. The inner ring 51 has a pivotal driving engagement with the outer ring 52 by means of diametrically opposed pins or screws 59 seated in ring 52 and having their ends entering into recesses or seats 60 formed in the convex face of ring 51. Members 59 are arranged at right angles to members 57ª whereby friction member 49 carried by said rims can be tilted in any direction in order to accommodate itself to the inner face of the rim of member 56 and therefore it is not necessary that the shafts of the fly wheel members be in perfect coaxial alignment.

I claim:

1. A fly wheel comprising in combination a fly wheel driving member provided with an inwardly presented concentrically disposed face, a driven fly wheel member, a friction band carried by said driven member and disposed in correlation with the concentrically arranged face of said driving fly wheel member, and centrifugally operable means carried by said driving fly wheel member and adapted to bear against said friction band and force it into operative engagement with the face of said driving member.

2. In a device of the class described, the combination with a driving fly wheel member and a driven fly wheel member, of a friction band carried by said driven member and adapted to engage said driving member, and centrifugally operable segmental members adapted to engage said friction band and force it into operative engagement with said fly wheel driving member.

3. A clutch comprising a driving member, a driven member, a friction band carried by said driven member and disposed in cooperative relation with said driving member, and a plurality of segmental blocks carried by said driving member and adapted to be moved by centrifugal action into engagement with said friction band and force it into operative engagement with said driving member.

4. A clutch comprising a driving member, a driven member, a friction band carried by said driven member and disposed in cooperative relation with said driving member, a plurality of segmental blocks carried by said driving member and adapted to be moved by centrifugal action into engagement with said friction band and force it into operative engagement with said driving member, and circular spring members interengaging said blocks for yieldingly maintaining said blocks in a predetermined relation with the driven member in accordance with the speed of said driving member.

5. In a device of the class described, a pair of independently rotatable members each of which is provided with an annular inwardly presented face, said faces being arranged contiguous to each other, a flexible band secured to one of said faces and in cooperative relation with the face of the other member, and weighted members carried by the last mentioned rotatable member and movable outwardly by centrifugal action against said flexible band for forcing the latter into driving engagement with the last mentioned rotatable member.

6. In a device of the class described, a pair of independently rotatable members arranged in coaxial juxtaposed relation with each other, each of said members being provided with an annular inwardly disposed face, a flexible band carried by the face of one of said members and adapted to frictionally engage the face of the other one of said members, a split resilient ring, and weights carried by said ring and operable by centrifugal action for controlling the frictional interengagement between said flexible band and the corresponding rotatable member.

7. In a device of the class described, a pair of independently rotatable members provided with inwardly disposed annular faces, a ring having circumferential pivotal engagement with the rim of one of said members, a flexible band carried by said ring and adapted to frictionally engage the annular face of the other one of said members, and weights carried by the last-mentioned rotatable member and operable by centrifugal force for forcing said flexible band into driving engagement with the last-mentioned rotatable member.

8. In a device of the class described, a pair of rotatable members, a series of rings arranged within the rim of one of said members and having peripheral pivotal engagement with each other and with said rim, a flexible band carried by the innermost one of said rings and adapted to operatively engage the face of the other one of said rotatable members, and weights carried by the last mentioned rotatable member and operable by centrifugal force for forcing said flexible band into driving engagement with said last-mentioned rotatable member.

9. In a device of the class described, a pair of independently rotatable members, a flexible mounting carried by one of said members, a frictional band carried by said flexible mounting and having cooperative relation with the other one of said rotatable members, and weights carried by the last-mentioned rotatable member and operable by centrifugal force for forcing said frictional band into driving engagement with the last-mentioned rotatable member.

In testimony whereof I hereunto affix my signature this 11th day of October, 1924.

JOHN O. CARREY.